United States Patent [19]

Ahner

[11] Patent Number: 4,545,299

[45] Date of Patent: Oct. 8, 1985

[54] HAND-OPERATED PRESS FOR TREATING VEGETABLES OR FRUIT

[76] Inventor: Reinhard Ahner, Wolfganggasse 25, A-1120 Vienna, Austria

[21] Appl. No.: 645,705

[22] Filed: Aug. 30, 1984

[30] Foreign Application Priority Data

Aug. 31, 1983 [AT] Austria .................................. 3119/83
Jul. 24, 1984 [AT] Austria .................................. 2393/84

[51] Int. Cl.[4] ............................................. B30B 9/00
[52] U.S. Cl. ................................. 100/112; D7/101; 99/495; 100/125; 100/234
[58] Field of Search .................... 99/495-497; D7/101, 99, 105; 100/112, 125, 234, 233, 243

[56] References Cited

U.S. PATENT DOCUMENTS

| 1,762,031 | 6/1930 | Roberts . | |
| 1,840,182 | 1/1932 | Bailey . | |
| 2,297,342 | 9/1942 | Woodard . | |
| 3,327,621 | 6/1967 | Zysset | 100/125 |
| 4,069,752 | 1/1978 | Ahner | 100/112 |
| 4,466,346 | 8/1984 | Gemelli | 99/495 X |

FOREIGN PATENT DOCUMENTS

| 618030 | 8/1935 | Fed. Rep. of Germany . |
| 1255877 | 12/1967 | Fed. Rep. of Germany . |
| 1202612 | 1/1960 | France . |
| 94658 | 5/1922 | Sweden . |

Primary Examiner—Timothy F. Simone
Attorney, Agent, or Firm—Fleit, Jacobson, Cohn & Price

[57] ABSTRACT

The hand-operated press for treating vegetables or fruit comprises two levers, which are connected by an articulated joint and in at least part of their length constitute handles. The material to be treated is forced through at least two holding chambers, one or more of which may be provided on one or each lever. Each holding chamber provided on one lever has associated with it a ram provided on the other lever. As the handles are forced toward each other, each ram enters the associated holding chamber and forces the material to be treated through openings in the bottom defining the holding chamber. The holding chambers are provided with different openings, which may be square or elongated so that the hand-operated press may be used to disintegrate the fruit or vegetables into disc-shaped or prismatic pieces as the fruit or vegetable is forced through the openings.

18 Claims, 25 Drawing Figures

HAND-OPERATED PRESS FOR TREATING VEGETABLES OR FRUIT

SUMMARY OF INVENTION

The hand-operated press for treating vegetables or fruit comprises two levers, which are connected by an articulated joint and are provided with at least two holding chambers and with rams fitting said holding chambers. The bottom defining each holding chamber is provided with through openings, which have different cross-sections in different bottoms. The pressure-applying surfaces of the rams and/or the outside surfaces of the levers or of the rams are formed with elevations, which enter the openings of the bottoms and clean said openings at the end of the pressure-applying operation and when the levers are pivotally moved opposite to the sense in which pressure is applied.

This invention relates to a hand-operated press for treating vegetables or fruit, comprising two levers, which are connected by an articulated joint and at least in part of their length constitute handles, one lever being provided with a holding chamber, which is adapted to receive the material to be treated and is defined by a bottom formed with through openings, whereas the other lever is provided with a ram, which during a pivotal movement of the levers enters the holding chamber, at least two holding chambers being provided.

Hand-operated presses of that kind are mainly used for disintegrating garlic and onions for spicing food.

U.S. Pat. No. 1,762.031 describes a press of the above-mentioned kind, in which one lever has a holding chamber, which is divided into two halves by a central cutting wall.

U.S. Pat. No. 1,840.182 discloses a fruit press, in which a container having two holding chambers separated by a partition is secured to a stand, a manually operable lever is provided, which is pivoted to the container, and two rams are provided, which are pivotally connected to the lever by a common forked arm connecting said rams. The fruit to be treated, e.g., an orange, is divided into two halves to such an extent that the halves are still connected by a portion of the peel. The two halves are then placed into the holding chambers so that the connecting portion of the peel is disposed on the partition. German Patent Publication No. 1,255.877 discloses an implement which is made of plastic and serves to cut and squeeze fruit and vegetables. That implement comprises a base and a pressure-applying lever pivoted to said base. That lever carries a pressure-applying plate, which during an operation of the pressure-applying lever moves in a frame provided in the base toward an inserted cutting plate or perforated plate detachably mounted in said frame.

The known implements permit the fruit or vegetable to be disintegrated only to particles or pieces having a single size and shape. It has been found, that particles or pieces differing in size or shape are desired for different foods, in dependence on the manner in which they have been prepared—grilled, cooked, roasted etc.—in the treatment of different fruits or vegetables (in most cases smaller particle sizes for garlic and coarser particle sizes for onions, so that two different presses were previously required), and in dependence on the use of the disintegrated material, e.g., as a spice, garnish etc.

It is an object of the present invention to provide a hand-operated press which avoids the disadvantages of the known implements and by which material can be disintegrated to a small and/or large particle size at the same time or in any desired sequence.

In a hand-operated press of the kind described first hereinbefore, that object is accomplished in accordance with the invention in that the bottoms defining different holding chambers are formed with different openings.

In order to permit a cleaning of the openings provided in the bottoms of the holding chambers, a further feature of the invention resides in that at least one of the levers is provided with cleaning pins, which may be provided in a plurality of sets, each of which corresponds to the openings of one set thereof. In this arrangement a pivotal movement of the levers opposite to the direction in which pressure is applied will cause the pins to enter the openings of the holding chamber which has been used.

Austrian Patent Specification No. 294,351 discloses the use of cleaning pins. But the known implement has only holes of one kind, and for that reason, only pins of one kind. If such pins were used in the hand-operated press in accordance with the invention, the pins could clean only the openings of the set for which the pins are intended whereas the other openings could not be adequately cleaned or pins larger in cross-section than the openings could not enter the openings.

Further details of the invention will be explained more fully with reference to the drawing showing a plurality of illustrative embodiments of the hand-operated press in accordance with the invention.

FIG. 15 is a sectional view taken on line XV—XV in

FIG. 24 shows the pressure-applying end portion of a ram or the like, which is provided with an insert that carries knives, bars or the like.

Figures 1, 2, 3:
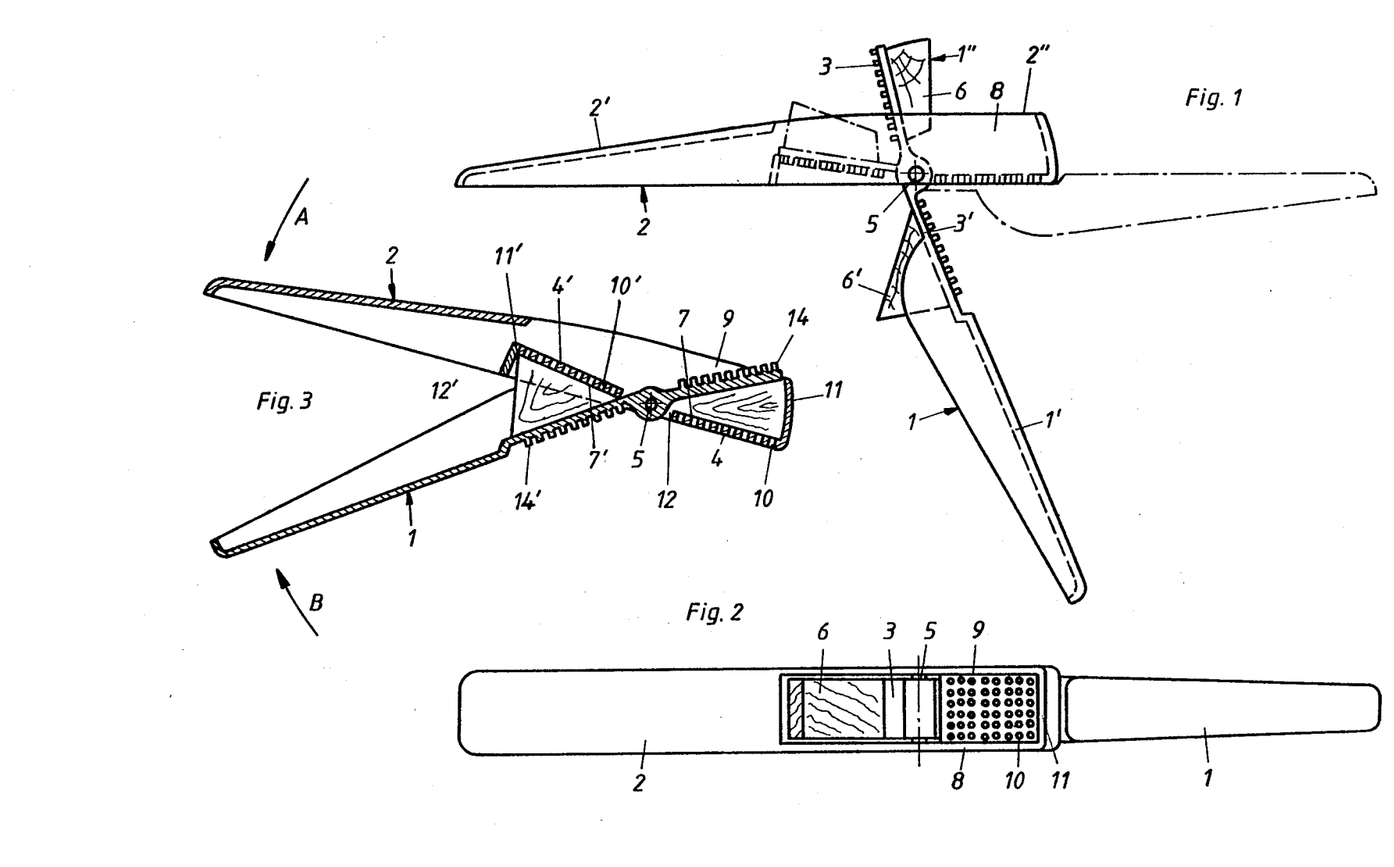
FIG. 1 is a side elevation showing the hand-operated press in a partly open state.
FIG. 2 is a top plan view showing the press in an open position.
FIG. 3 is a longitudinal sectional view showing a hand-operated press at the beginning of the working stroke.

The hand-operated press shown in FIGS. 1 to 3 comprises two double-armed levers 1,2, which are connected by a hinge 5 and each of which has two arms differing in length. The longer arms 1',2' include handles and the shorter arms 1", 2" are provided with a ram 3 and with a sieve 4, respectively. Next to the hinge 5, the handle 1' is also provided with a ram 3', which is disposed on that side of the hinge which is opposite to the ram 3 and is diagonally spaced from the latter. Next to the hinge 5, the handle 2' is provided with a sieve 4', which is opposite to the sieve 4. Each of the rams 3 and 3' is provided on its side facing the associated sieve 4 or 4' with a plunger or pressing member 6 or 6'. The hinge 5 may be separable, if desired so that the two levers 1,2 can be taken apart when they are to be cleaned. Each of the sieves 4,4' comprises a bottom 7,7'. When the working stroke of the press has been completed, the bottom 7 and the plunger 6 are in contact with each other and so are the bottom 7' and the plunger 6'. Walls 8,9,11 and 8',9'11' extend from the sides and ends of each of the bottoms 7 and 7' and together with the associated bottoms 7 and 7' define a pressing chamber 12 or 12' for receiving the material to be treated. The bottoms 7 and 7' are formed with openings 10 and 10', respectively, which consist, e.g., of circular holes. The openings of one bottom are larger than or differ in configuration from the openings of the other bottom. On that side which at the end of the working stroke is remote from the openings 10, 10', the two rams 3,3' are provided with spaced projections or elevations in the form of pins 14 and 14', respectively. When the levers 1, 2 are in the extended position indicated in phantom in FIG. 1, said pins enter from the rear of the bottoms 7, 7' into their holes 10, 10' so that the residues left in the openings through which the material has passed will be forced back into the holding chamber 12 or 12' and all holes will be cleaned at the same time.

The hand-operated press which has been described has the following mode of operation: when material to be treated is placed into the holding chamber 12 and the two handles 1, 2 are moved toward each other in the directions of the arrows A, B in FIG. 3, the plunger 6 will force the compressed material through the bottom 7 and particularly through its openings or holes 10. When the levers 1, 2 are subsequently moved to the extended position shown in FIG. 2, the pins 14 will enter the openings 10 so that the residues left in the openings will be forced back into the holding chamber 12. When it is desired to treat material in the holding chamber 12', the implement is rotated through 180° from the position shown in FIG. 3 so that the bottom 7' is underneath and the plunger 6' enters the holding chamber 12' from above. In other respects the operation is performed as described hereinbefore.

The holding chamber 12 can be more easily cleaned if one of the side walls 8 and 9 is eliminated in the sieve 4 or 4' and provided on the ram 3 or 3' on the same side thereof when the implement is in working position, as is described more in detail in Austrian Patent Specification No. 337.392. In that case the holding chamber 12 or 12' is open on one side so that residues can be removed from the holding chamber by means of a brush or the like. In that embodiment the holding chamber is being closed during the working stroke as soon as the above-mentioned side wall of the ram 3 or 3' begins to overlap the bottoms 7 and 7' of the associated sieves 4 and 4', respectively.

In the embodiment described by way of example, one holding chamber 12 is provided on the shorter lever arm 2" and the other holding chamber 12' is provided on the longer lever arm 2' on the opposite side of the hinge 5 and adjoins the latter. But in that case only one holding chamber can be used at a time.

If it is desired to use both holding chambers at the same time, the two embodiments described hereinbefore can be modified in that at least the shorter arms 1" and 2" of the respective levers 1, 2 are enlarged in width, e.g., to twice the width, so that the two holding chambers 12, 12' can be juxtaposed and separated by a partition. In that case, a wide ram is provided, which is divided into two parts by a slot which has a width that is somewhat larger than the thickness of said partition, and the parts of said ram may be provided, if desired, with respective plungers and may enter the two holding chambers 12, 12' at the same time. Also in that case the cleaning pins 14, 14' are provided on the rear of of the rams 3, 3' and in all embodiments the thickness of the pins matches the size of the openings.

Figure 4:
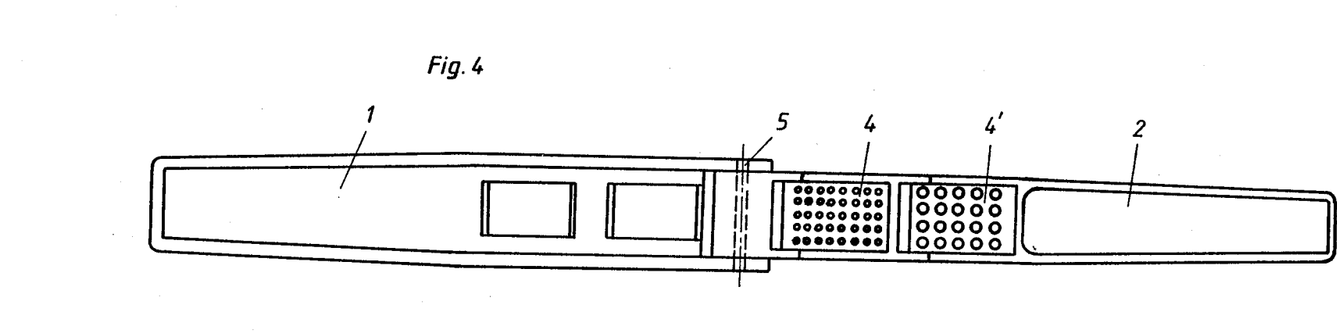
FIG. 4 shows a second embodiment of the hand-operated press in an extended position.
Figure 5:
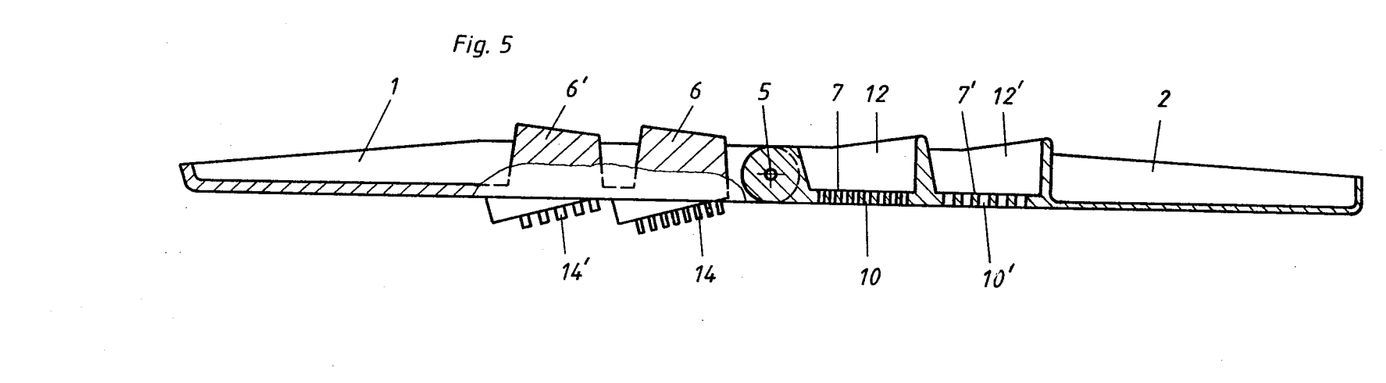
FIG. 5 is a longitudinal sectional view showing the press of FIG. 4.

Another modification of the hand-operated press in accordance with the invention is shown in FIG. 4 and comprises two one-armed levers 1, 2, which are connected at one end by a hinge 5. In this embodiment the lever 2 is provided with two holding chambers 12, 12', which are disposed next to the hinge 5 and arranged one behind the other and defined by respective bottoms 7 and 7'. One of said bottoms has openings or holes which are smaller or larger than those of the other bottom. The lever 1 is provided with rams or plungers or the like, which are opposite to the holding chambers 12, 12', respectively, and enter the latter as the two levers are moved toward each other. On the outside or back of each lever 1, remote from the ram, plunger or the like, the lever 1 is provided with respective sets of pins 14 and 14' for cleaning the openings 10 and 10', respectively, when the levers 1 and 2 are turned round about the hinge 5 and the pins 14, 14' enter the openings from the outside of the bottoms 7, 7' and force the residues back into the holding chambers 12 and 12'. Just as in the embodiments described before, the holding chambers 12, 12' may also be juxtaposed. In both cases, one outer side wall of each holding chamber 12 or 12' may be eliminated and provided on the other lever 1.

Figure 6:
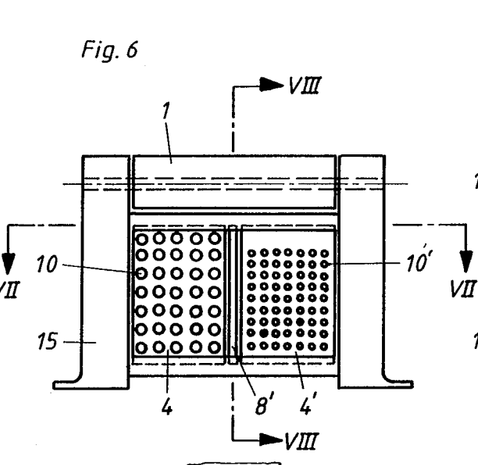
FIG. 6 shows another embodiment of the hand-operated press.
Figure 7:
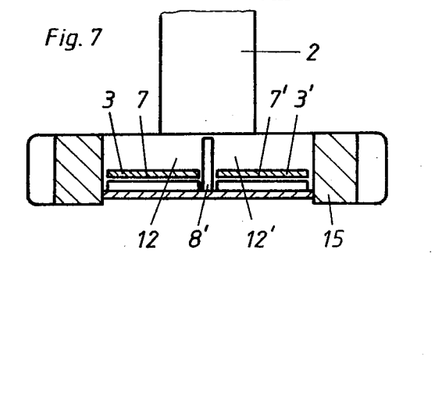
FIG. 7 is a sectional view taken on lines VII—VII in FIG. 6.
Figure 8:
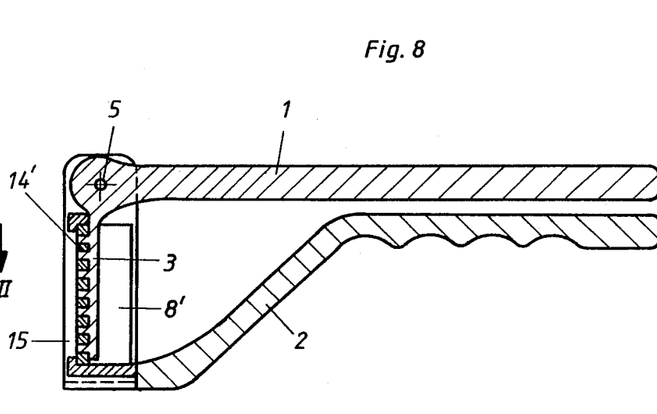
FIG. 8 is a sectional view taken on lines VIII—VIII in FIG. 6.
Figure 9:
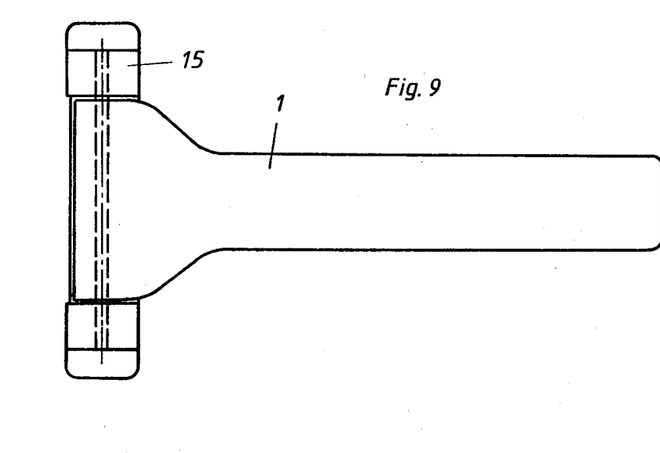
FIG. 9 is a top plan view showing the hand-operated press of FIGS. 6 to 8.

In an implement having one-armed levers 1, 2, the bottoms 7, 7' may be provided at the ends, as is shown in FIG. 6, and may extend over two holding chambers, which are separated by a partition. In that case the openings associated with the respective chambers may differ in size. In this embodiment the lever 1 provided with one or more rams 3, 3' is hinged to the top edge of a frame 15, which surrounds the bottoms 7, 7' and which is preferably rectangular, e.g., square. That frame 15 is carried by the lever 2. The ram may be formed with a slot, which receives the partition 8' during the working stroke so that each part of the ram enters the associated holding chamber 12 or 12'. In this embodiment the rams 3 and 3' are provided with pins 14, which enter the holes 10 and 10'. Alternatively, as in the embodiments described before, said pins may be provided on the back of the lever 1 so that they enter the holes 10, 10' from the outside.

Figure 10:
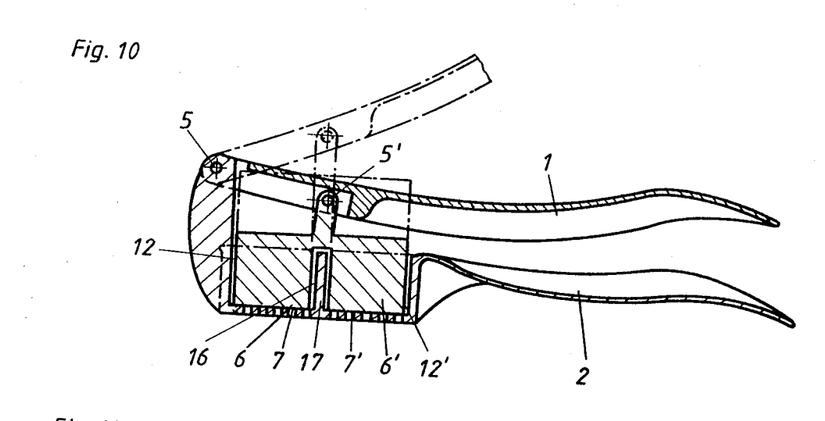
FIGS. 10 and 11, respectively, are a longitudinal sectional view and a bottom view showing another embodiment of a hand-operated press having one-armed levers.
Figure 11:
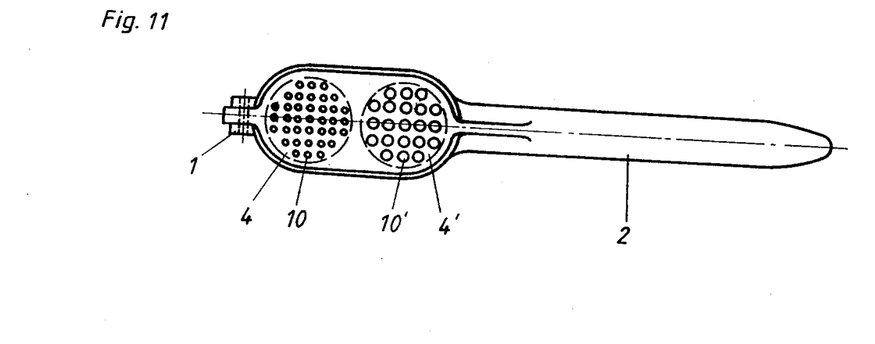

The ram may be designed as desired, e.g., as a member which is hinged to the lever 1. Such an embodiment is shown in FIGS. 10 and 11. In this embodiment the ram is hinged to the lever 1 at 5' in spaced relationship to the lever hinge 5 and comprises two closely adjacent integral plungers 6, 6', which are separated by the slot 16, which receives the partition 17 as the plungers 6, 6' enter the holding chambers 12, 12' as a unit. If the hinges 5, 5' are properly located, pins for cleaning the holes 10, 10' may be provided on the back of the lever 1.

Alternatively, a separate ram for each holding chamber 12 or 12' or a common ram for both holding chambers may be provided. In the latter case, the walls defining the holding chambers may be so designed that the ram can be selectively moved into each holding chamber.

Figure 12:
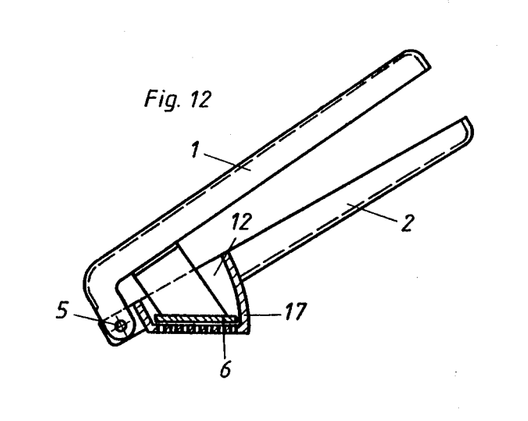
FIGS. 12 to 14 show another embodiment of the hand-operated press comprising one-armed levers and juxtaposed holding chambers, FIG. 12 being a sectional view taken on line XII—XII of FIG. 13, FIG. 13 a top plan view and FIG. 14 a bottom view of the hand-operated press.
Figure 13:
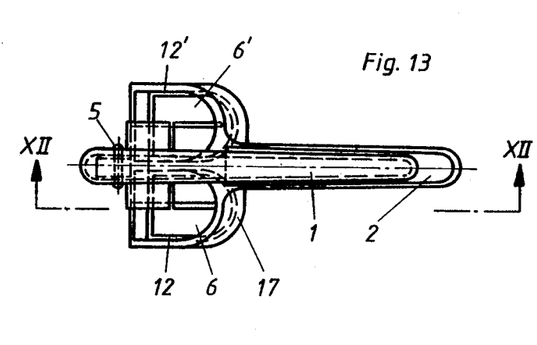
Figure 14:
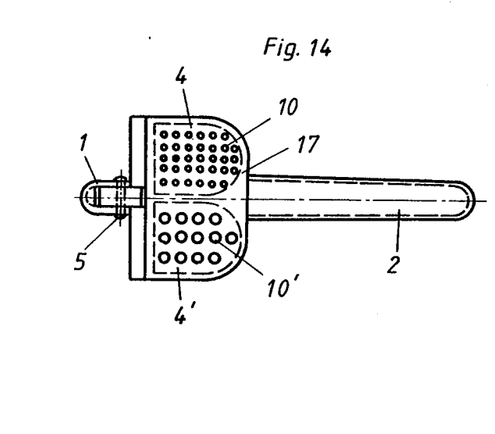

In the embodiment shown in FIGS. 12 to 14 the holding chambers 12, 12' are juxtaposed and cooperate with respective plungers 6, 6'. Pins for cleaning the openings 10, 10' from the outside may be provided on the back of the lever 1. Also within the scope of the invention the plunger may be adjustably mounted on the lever 1.

Figure 15:
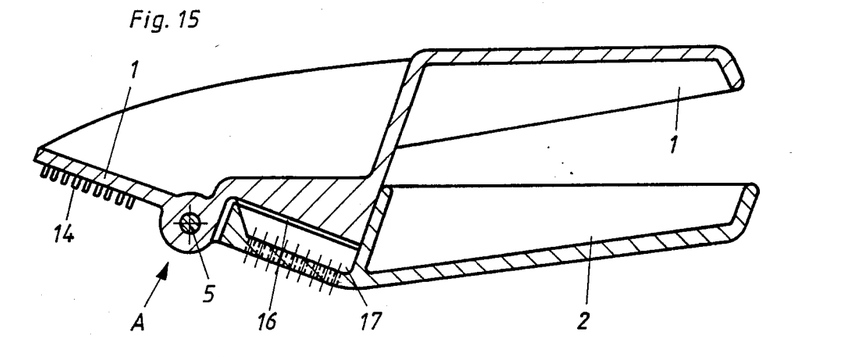
Figure 16:
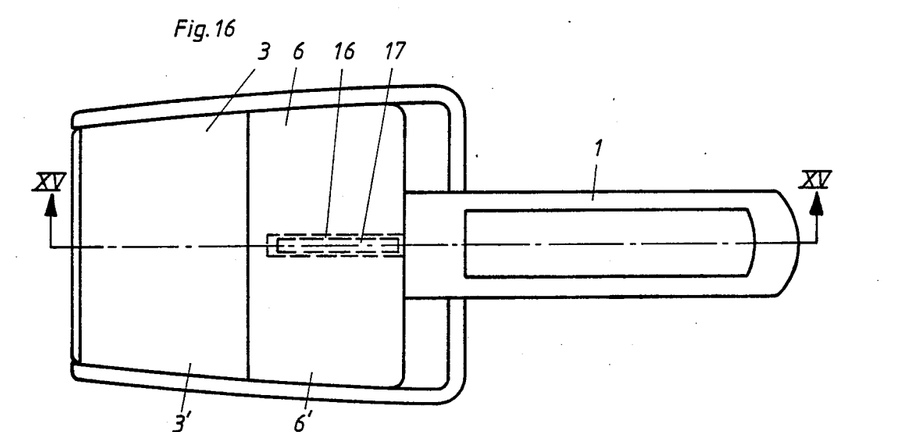
FIG. 16, which is a top plan view showing another embodiment of the hand-operated press in accordance with the invention.
Figure 17:
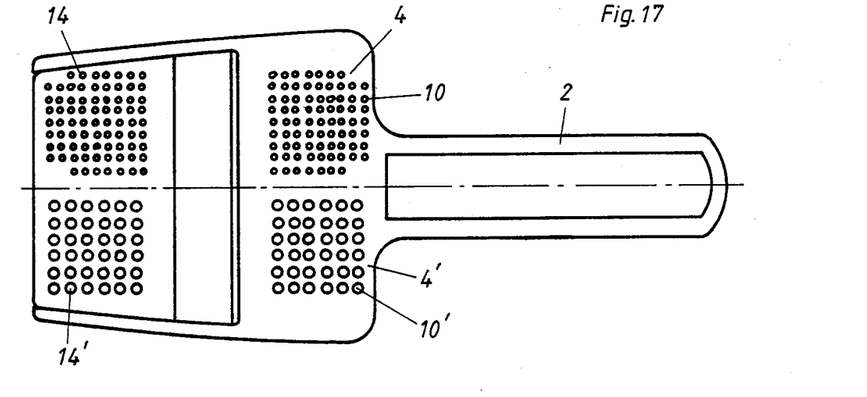
FIG. 17 is a bottom view taken in the direction indicated by the arrow A in FIG. 15.

FIGS. 15 to 17 show a combination of a two-armed lever and a one-armed lever. The one-armed lever 2 is provided with two juxtaposed sieves 4, 4', which define holding chambers, which are separated by a partition 17. The bottoms defining said holding chambers are formed with the openings 10 and 10', respectively. The two-armed lever 1 is connected to the working end of the one-armed lever 2 by a hinge 5. The two-armed lever 1 carries two plungers 6, 6', which are separated by a slot 16, which receives the partition 17 when the two levers 1, 2 have completed their working stroke. The shorter arm 1" is provided on its outside surface with pins 14, 14", and as the two levers 1, 2 are extended said pins 14, 14' enter from the outside into the openings 10, 10' to clean the same.

Figure 18:
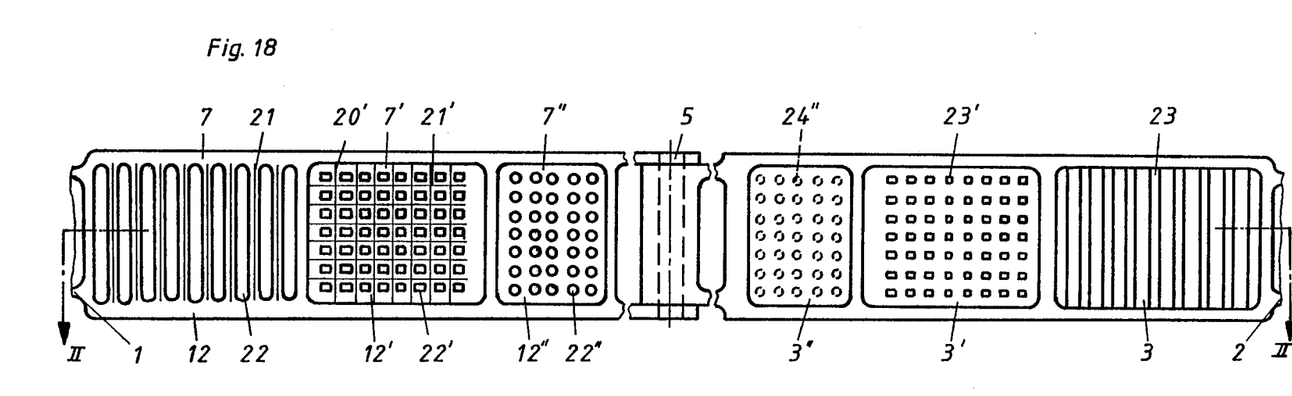
FIG. 18 is a top plan view showing another embodiment of the hand-operated press in an open position.
Figure 19:
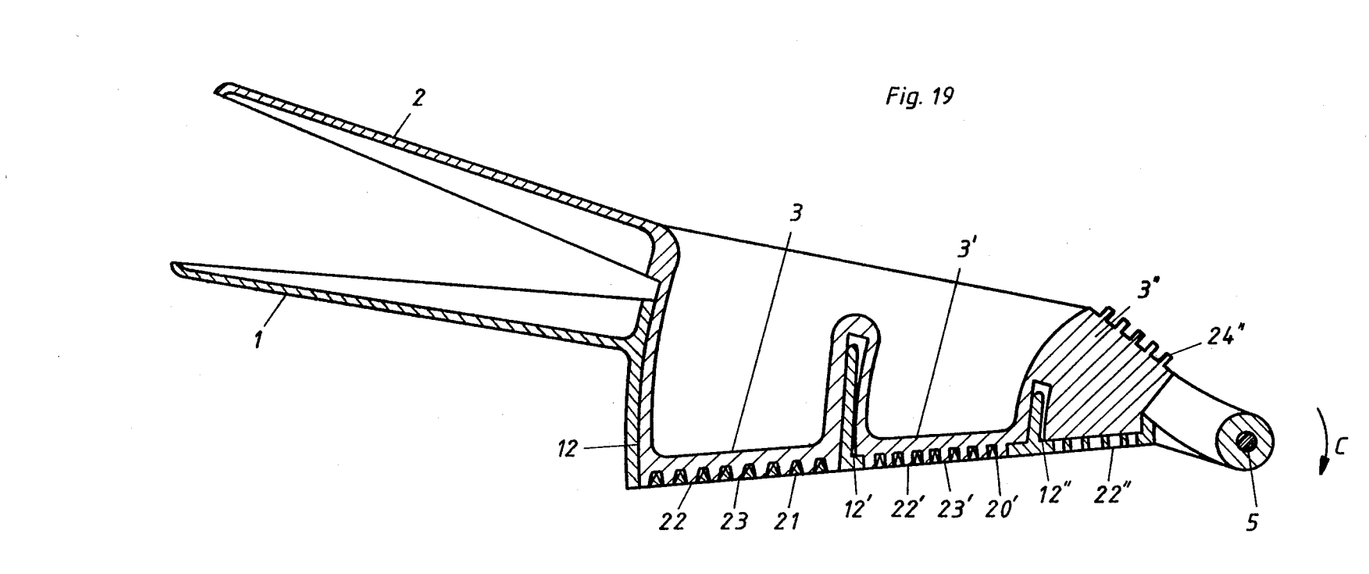
FIG. 19 is a longitudinal sectional view taken on line XVIII—XVIII in FIG. 18 and shows the hand-operated press in the position assumed at the end of its working stroke.

In the embodiment shown in FIGS. 18 and 19 the two levers 1, 2 are one-armed and the lever 1 is provided next to the hinge 5 with three holding chambers 12, 12', 12", which are arranged one behind the other and defined by respective bottoms 7, 7', 7". One bottom 7 consists of knives 21, which extend only in one direction, in the present case in the transverse direction, and the other bottom 7' consists of knives 20', 21' extending in the longitudinal and transverse directions. The third bottom is provided with sieve holes 22". Slotlike interstices 22 are defined in the holding chamber 12 by the knives 21 and square interstices 22' are defined in the holding chamber 12' by the knives 20', 21' so that the material is treated into slices or prismatic pieces, whereas juice is expressed in the holding chamber 12". The lever 2 is provided with a plurality of rams, plungers or the like 3, 3', 3", which register with the holding chambers 12, 12', 12", respectively. Each of said rams, plungers or the like has either a smooth outside surface or those of said rams, plungers or the like which are associated with the bottoms 7 and 7' are formed with elevations 23, 23', which are indicated by dotted lines in FIG. 18 and are indicated in section and in solid lines in FIG. 19. Said elevations 23, 23' are in register with and match respective interstices 22 and 22' and enter the interstices 22 and 22' and force the compressed material out of said interstices during the working stroke.

As is apparent from FIG. 19, the lever 2 is provided on its rear, remote from the ram 3", with elevations 24". When the lever 2 has been turned around the hinge 5 in the direction indicated by the arrow C in FIG. 19, said elevations enter the holes 22" to free the latter from residual fruit or vegetable material. It will be understood that corresponding elevations may be provided on the back of the lever 2 for an additional cleaning of the interstices 22 and 22".

Figure 20:
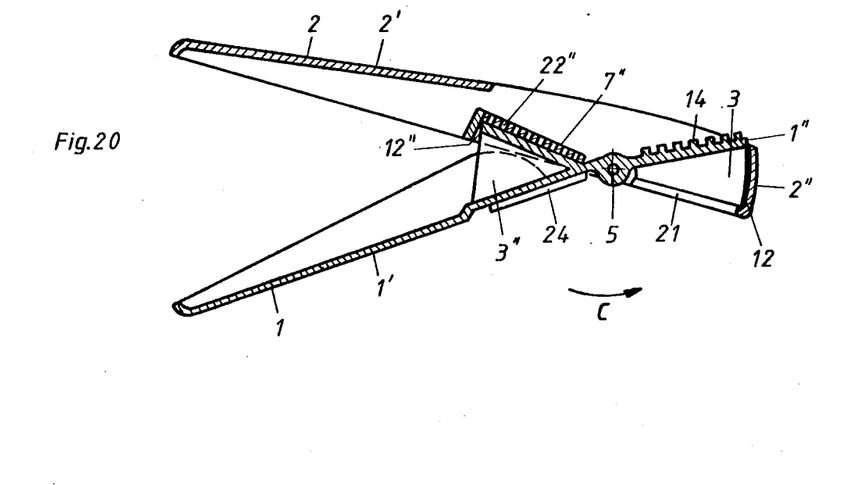
FIG. 20 is a longitudinal sectional view showing a further embodiment of a hand-operated press also in the position assumed at the end of the working stroke.

In the embodiment of the hand-operated press shown in FIG. 20 each of the two levers 1,2 has two arms differing in length. The longer arms 1', 2' constitute handles and each of the shorter arms 1" and 2" is provided with a ram, plunger or the like 3 or with a holding chamber 12. Next to the hinge 5, the handle 1' is also provided with a ram, plunger or the like 3", which is diagonally spaced apart from the ram, plunger or the like 3. The handle 2' is provided next to the hinge 5 with a holding chamber 12". In the present case the bottom of the holding chamber 12" is formed with round holes 22" and the bottom of the holding chamber 12 consists of longitudinally extending knives 21 so that the fruit or vegetable material in the holding chamber 12 will be cut into slices and the fruit or the vegetable material in the holding chamber 12' will be squeezed to express juice therefrom or will be crushed. On that surface which will contact the outside of the bottom 7" when the lever 1 is pivotally moved in the direction indicated by the arrow C the shorter arm 1" is provided with pins 14 for cleaning the holes 22". For the same purpose, the lever arm 1' may be provided with ribs 24.

Figure 21:
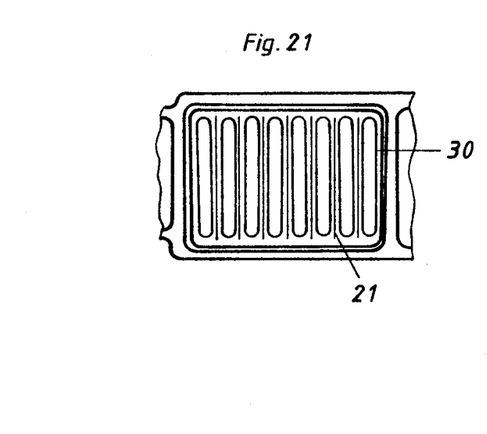
FIG. 21 is a top plan view showing a detachably mounted bottom defining a holding chamber.
Figure 22:
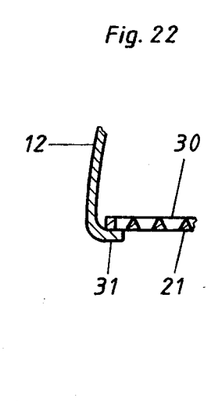
FIG. 22 is a transverse sectional view showing a part of a holding chamber and a detachably mounted bottom.
Figure 23:
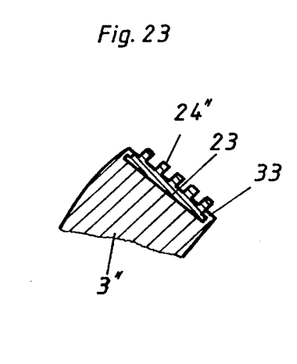
FIG. 23 is a transverse sectional view showing a ram provided with a detachably mounted insert.

It will be understood that various structural modifications may be adopted within the scope of the invention. For instance, the bottoms defining the holding chambers may be detachably mounted so that a bottom provided with knives, bars or sieve holes may be used in dependence on whether the fruit or vegetable material is to be disintegrated, crushed or squeezed to express juice. The selected shape and size of the interstices between the knives or bars will depend on the desired crushing or disintegration of the fruit or vegetable material. Such a bottom is shown in FIGS. 21 and 22. In accordance with said Figures the knives 21 are fixed in a frame 30, which is placed on a bottom extension 31 of the holding chamber 12. The bottom may be detachably fixed by a snap-action device, not shown, so that the bottom will not lift from the surface 31 as the bottom is cleaned from the outside by means of pins. If the bottoms defining the holding chambers are detachable, those pressure-applying surfaces which are provided with elevations entering the openings of the bottom will also be provided with detachable inserts so that the elevations of the pressure-applying surfaces of the rams will match the openings of the bottoms defining the holding chambers. This remark is also applicable to any elevations which are provided on the outside surface of the lever and serve to clean the openings or holes. Such an embodiment is shown in FIG. 23. In that embodiment the insert consists of a plate 23, which carries the elevations 24" and is slidably mounted in and can be removed from tracks 33 provided on the back of the ram 3" in the embodiment shown in FIG. 19.

Figure 24:
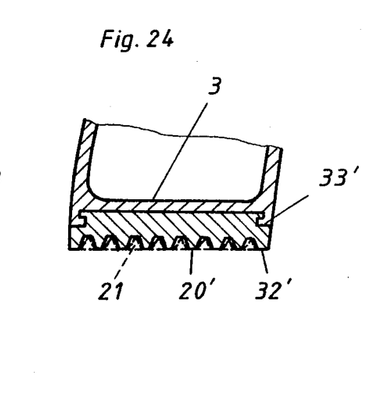

The insert provided at the bottom or on the pressure-applying surface of the ram 3 may be mounted in a similar manner. For instance, FIG. 24 shows such an insert 32', which may be provided with knives, bars or the like 21, and 20' and is slidably mounted in and removal detachably and slidably mounted in tracks 33'.

Figure 25:
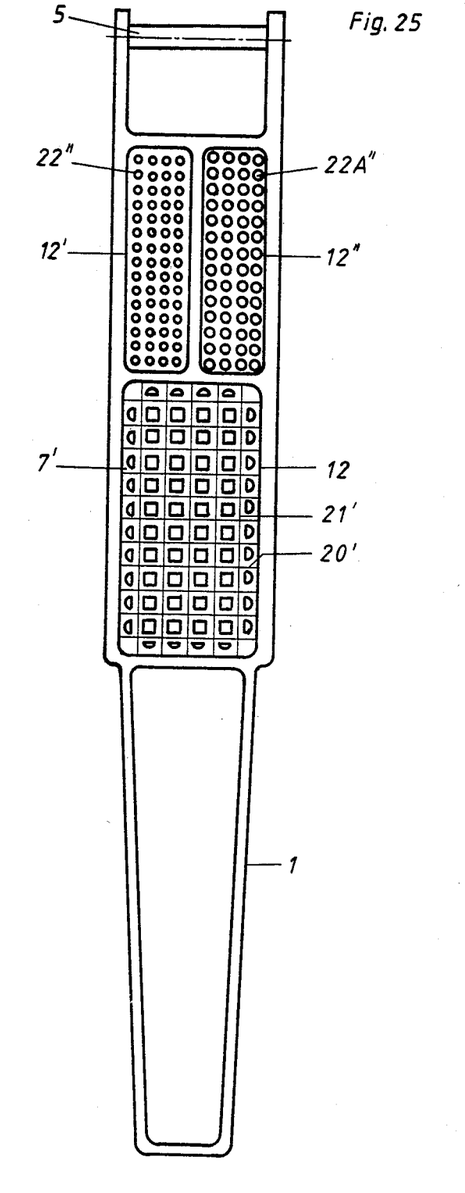
FIG. 25 is a top plan view showing that lever of the hand-operated press which is provided with the holding chambers.

The embodiments of the hand-operated press shown in FIG. 25 is similar to the embodiment shown in FIG. 18 with the difference that the arrangement of the holding chambers is different. For the sake of simplicity, only the lever 1 is shown in FIG. 25 in a top plan view on the holding chambers. In the present embodiment the holding chamber 12 is larger than the holding chamber 12' and 12" and provided with crossing knives, bars or the like 20' or 21'. The bottom 7' carrying said bars, knives or the like may be detachably mounted. The holding chambers 12', 12" are juxtaposed and disposed near the holding chamber 12 between the latter and the hinge 5. In the present case the holding chamber 12' is adjoined by a set of small holes 22" and the holding chamber 12" by a set of larger holes 22A". The lever 2 is not shown and provided with matching rams, which may be designed like the rams of the embodiment shown in FIG. 18 but arranged like the holding chambers.

The selection of the number and arrangement of the holding chambers and of the associated rams is at the discretion of the designer of the hand-operated press. They may be provided in any desired pattern and number one beside the other and/or one behind the other, and the handle levers 1, 2 may be one-armed or two-armed.

Alternatively, each of the two levers may be provided with at least one holding chamber and with at least one ram for cooperating with the holding chamber of the other lever.

Moreover, in the embodiments comprising rams, plungers or the like 3 or 3' for disintegrating the fruit or vegetable material into prismatic pieces or slices the pressure-applying surface of said rams, plungers or the like 3 or 3' may be smooth. But in that case the provision of the above-mentioned cleaning pins or cleaning ribs will be desirable.

Finally, the arms of double-armed levers may be of equal length.

What is claimed is:

1. A hand-operated press for treating vegetables or fruit, comprising two levers, which are pivotally connected and in at least part of their length serve as arms, wherein one of said levers is provided with a pressing chamber, which serves to receive the material to be treated and is defined at least in part by a bottom wall formed with through openings, and the other of said levers is provided with a pressing member, which during a pivotal movement of the levers is adapted to enter the pressing chamber, and wherein at least two pressing chambers are provided and are defined at least in part by bottom walls formed with through openings having different cross-sections to obtain juice or different size pieces of the vegetables or fruit, and wherein at least two pressing members are provided for entering respective ones of the pressing chambers.

2. The hand-operated press according to claim 1, wherein at least one of the levers is provided with a set of spaced projections, and wherein a plurality of sets of projections are provided and each of said sets matches one group of said openings, so that a pivotal movement of the levers opposite to the working direction will cause the projections to enter the openings in the bottom walls defining the pressing chambers and to clean said openings.

3. The hand-operated press according to claim 1, wherein each lever is provided with at least one of the pressing chambers and with at least one of the pressing members, with the pressing member of each lever cooperating with the pressing chamber of the other lever.

4. The hand-operated press according to claim 1, wherein the pressing chambers are provided on one lever and arranged one behind the other and the pressing members cooperating with the pressing chambers are provided on the other lever and arranged one behind the other.

5. The hand-operated press according to claim 1, wherein the pressing chambers are juxtaposed and provided on one lever and the pressing members cooperating with the pressing chambers are juxtaposed and provided on the other lever.

6. The hand-operated press according to claim 1, wherein the bottom walls defining the pressing chambers comprise spaced apart lands, bars or knives extending in at least one direction.

7. The hand-operated press according to claim 6, wherein each of the pressing members is provided with spaced projecting elevations on a surface which enters the respective pressing chamber and said elevations match the cross-section of the openings defined by the lands, bars or knives and enter said openings at the end of the working stroke of the press.

8. The hand-operated press according to claim 1, wherein the bottom walls defining the pressing chambers are detachably mounted.

9. The hand-operated press according to claim 1, wherein spaced projections are provided on pressure-applying surfaces of the pressing members and enter the openings in the bottom walls defining the pressing chambers, the projections being provided on detachable inserts.

10. The hand-operated press according to claim 1, wherein spaced projections for cleaning the openings of the bottom walls defining the pressing chambers are provided on detachably mounted inserts.

11. A hand-operated press for treating vegetables or fruit, comprising two levers which are pivotally connected and in at least part of their length serve as arms, wherein one of said levers is provided with a pressing chamber, which serves to receive the material to be treated and is defined at least in part by a bottom wall formed with through openings, and the other of said levers is provided with a pressing member, which during a pivotal movement of the levers is adapted to enter the pressing chamber, wherein a plurality of pressing chambers are provided, with at least one of the pressing chambers being defined at least in part by a bottom wall comprising openings defined by spaced apart parallel lands, bars or knives extending in at least one direction, and wherein a plurality of pressing members are provided for entering respective ones of the pressing chambers.

12. The hand-operated press according to claim 11, wherein at least one of the pressing members is provided with projecting elevations on a surface which enters the one pressing chamber and said elevations match the cross-section of the openings defined by the lands, bars or knives and enter said openings at the end of the working stroke of the press.

13. The hand-operated press according to claim 1, wherein a third pressing chamber and a third pressing member are provided on respective ones of the levers, with the third pressing chamber defined at least in part by a bottom wall comprising openings defined by spaced apart parallel lands, bars or knives for cutting an article into slices.

14. The hand-operated press according to claim 13, wherein the third pressing member is provided with projecting elevations on a surface which enters the third pressing chamber and said elevations match the cross-section of the openings defined by the lands, bars or knives and enter said openings at the end of the working stroke of the press.

15. The hand-operated press according to claim 1, wherein the two levers are pivotally connected to one another by a pivotal connection intermediate opposite ends thereof, and wherein the pressing chambers and the pressing members are located on respective opposite sides of the pivotal connection.

16. The hand-operated press according to claim 15, in which the two levers have portions of relatively short length on respective first sides of the pivotal connection for supporting one of the pressing chambers and one of the pressing members, respectively, and have portions of relatively long length on respective second sides of the pivotal connection for supporting the second pressing chamber and the second pressing member, respectively, with the relatively long lever portions also defining handle portions of the levers.

17. The hand-operated press according to claim 16, which further comprises sets of spaced projections mounted on at least one of the levers so as to be movable through the openings in respective ones of the bottom walls of the pressing chambers, for cleaning material from the openings, said cleaning projections also being located on respective opposite sides of the pivotal connection of the levers.

18. The hand-operated press according to claim 1, wherein the pressing members form closely adjacent integral parts of a member hinged to one of the levers in spaced relationship to a pivotal connection of the levers to one another, and wherein the pressing members are movable into their respective pressing chambers as a unit.

* * * * *